US 6,670,301 B2

(12) United States Patent
Adzic et al.

(10) Patent No.: US 6,670,301 B2
(45) Date of Patent: Dec. 30, 2003

(54) CARBON MONOXIDE TOLERANT ELECTROCATALYST WITH LOW PLATINUM LOADING AND A PROCESS FOR ITS PREPARATION

(75) Inventors: Radoslav Adzic, East Setauket, NY (US); Stanko Brankovic, Coram, NY (US); Jia Wang, East Setauket, NY (US)

(73) Assignee: Brookhaven Science Associates LLC, Upton, NY (US)

( * ) Notice: Subject to any disclaimer, the term of this patent is extended or adjusted under 35 U.S.C. 154(b) by 221 days.

(21) Appl. No.: 09/812,246

(22) Filed: Mar. 19, 2001

(65) Prior Publication Data

US 2002/0132154 A1 Sep. 19, 2002

(51) Int. Cl.[7] .......................... B01J 23/74; B01J 23/40; B01J 23/44
(52) U.S. Cl. ........................ 502/185; 502/326; 502/339
(58) Field of Search ................... 502/326, 327, 502/332, 334, 339, 185

(56) References Cited

U.S. PATENT DOCUMENTS

| | | | |
|---|---|---|---|
| 3,650,838 A | | 3/1972 | Giner et al. |
| 4,146,458 A | * | 3/1979 | Horowitz et al. ............ 204/277 |
| 4,716,087 A | * | 12/1987 | Ito et al. ....................... 429/40 |
| 4,794,054 A | * | 12/1988 | Ito et al. ....................... 429/44 |
| 4,822,699 A | * | 4/1989 | Wan .............................. 429/40 |
| 5,024,905 A | * | 6/1991 | Itoh et al. ..................... 429/44 |
| 5,133,842 A | | 7/1992 | Taylor et al. |
| 5,843,195 A | | 12/1998 | Aoyama |
| 5,922,487 A | * | 7/1999 | Watanabe et al. ............. 429/44 |
| 6,007,934 A | * | 12/1999 | Auer et al. ..................... 429/44 |
| 6,183,894 B1 | | 2/2001 | Adzic et al. |
| 6,194,338 B1 | * | 2/2001 | Andolfatto et al. .......... 502/101 |
| 6,200,457 B1 | * | 3/2001 | Durand et al. ............... 205/771 |
| 6,232,264 B1 | * | 5/2001 | Lukehart et al. ............ 502/339 |
| 6,284,402 B1 | * | 9/2001 | Mallouk et al. .............. 429/40 |
| 6,326,098 B1 | * | 12/2001 | Itoh et al. ..................... 429/40 |
| 6,498,121 B1 | * | 12/2002 | Gorer ......................... 502/325 |

FOREIGN PATENT DOCUMENTS

| | | |
|---|---|---|
| EP | 0 898 318 A2 * | 2/1999 |
| EP | 0 952 241 A1 * | 10/1999 |

OTHER PUBLICATIONS

McEvoy, Augustin J., "Fuel Cell Technology Status and Prospects for EPFL Part– I," *Lab. De Photonique et des Interfaces, EPFL*, 1–9 (2001).

Brankovic, et al., "Spontaneous Deposition of Pt on the Ru(0001) Surface," *Journal of Electroanalytical Chemistry*, 01–6 (Apr. 20, 2001).

* cited by examiner

Primary Examiner—Cam N. Nguyen
(74) Attorney, Agent, or Firm—Margaret C. Bogosian

(57) ABSTRACT

An electrocatalyst is provided for use in a fuel cell that has low platinum loading and a high tolerance to carbon monoxide poisoning. The fuel cell anode includes an electrocatalyst that has a conductive support material, ruthenium nanoparticles reduced in $H_2$ and a Group VIII noble metal in an amount of between about 0.1 and 25 wt % of the ruthenium nanoparticles, preferably between about 0.5 and 15 wt %. The preferred Group VIII noble metal is platinum. In one embodiment, the anode can also have a perfluorinated polymer membrane on its surface.

20 Claims, 4 Drawing Sheets

CARBON MONOXIDE TOLERANT ELECTROCATALYST WITH LOW PLATINUM LOADING AND A PROCESS FOR ITS PREPARATION

This invention was made with Government support under contract number DE-AC02-98CH10886, awarded by the U.S. Department of Energy. The Government has certain rights in the invention.

BACKGROUND OF THE INVENTION

The present invention relates to electrocatalyst compositions and the procedure for their preparations. More specifically, the invention relates to electrocatalysts with low platinum loading that can be used in fuel cells and which have a high tolerance to carbon monoxide.

A "fuel cell" is a device which converts chemical energy directly into electrical energy wherein the over-all cell reaction is the oxidation of a fuel by oxygen or suitable oxidizing gas, such as air. The chemicals are usually very simple, often just hydrogen and oxygen. In which case, the hydrogen is the "fuel" that the fuel cell uses to make electricity. The essential components of such a fuel cell are two electrodes in contact with the oxygen-containing gas and the fuel, respectively, and an electrolyte, which is in contact with both electrodes and which can be acidic, alkaline, solid or liquid. In accordance with generally recognized convention, the oxygen electrode may be considered as the positive electrode and the fuel electrode as the negative electrode with reference to the external circuit. The electrolyte functions to permit transport of ions without direct electrical contact between the fuel and oxidizing gas whereby the oxidation of the fuel can take place only as a result of a directed flow of ions across the electrolyte and a corresponding flow of electrons in an external circuit. The basic process of energy conversion is highly efficient and essentially pollution-free. Also, since a single cell can be assembled in stacks of varying sizes, systems can be designed to produce a wide range of output levels.

The fuel cell was invented in 1839. However, fuel cells capable of producing significant power were not developed until 1959 when an alkaline fuel cell capable of producing 5,000 watts (5 kW) was introduced. This fuel cell served as a starting point for the fuel cells developed by NASA and used to provide electrical power on both the Gemini and Apollo spacecraft. As a result of NASA's work, fuel cells were shown to be capable of efficient and reliable electrical power generation. Unfortunately, the fuel cells of that era were also inherently expensive due to the large amount of platinum needed to manufacture the fuel cells.

In a typical fuel cell, gaseous fuels are fed continuously to the anode (negative electrode) compartment and an oxidant (i.e., oxygen from air) is fed continuously to the cathode (positive electrode) compartment. Current is generated by reaction on the electrode surfaces, which are in contact with an electrolyte. The fuel is oxidized at the anode and gives up electrons to an external load. The oxidant accepts electrons and is reduced at the cathode. Ionic current through the electrolyte completes the circuit.

A fuel cell, although having components and characteristics similar to those of a typical battery, differs in several respects. The battery is an energy storage device. The maximum energy available is determined by the amount of chemical reactant stored within the battery itself. The battery will cease to produce electrical energy when the chemical reactants are consumed (i.e., discharged). In a secondary battery, recharging regenerates the reactants, which involves putting energy into the battery from an external source. The fuel cell, on the other hand, is an energy conversion device that theoretically has the capability of producing electrical energy for as long as the fuel and oxidant are supplied to the electrodes. In reality, degradation, primarily corrosion, or malfunction of components limits the practical operating life of fuel cells. Also, the fuel cell is distinguished from a battery in that its electrodes are catalytically active.

In a proton-exchange membrane (PEM) fuel cell, hydrogen is supplied to the anode where it breaks apart into protons and electrons. The membrane conducts protons but not electrons. The protons flow through the membrane while the electrons travel through the external circuit and provide electrical power. The electrons reduce oxygen which reacts immediately with protons coming from anode through the membrane to produce water.

Group VIII noble metal electrocatalysts, such as platinum-ruthenium (Pt—Ru) electrocatalysts, are commercially offered for the use in proton-exchange membrane (PEM) fuel cells. These electrocatalysts are Pt—Ru alloys dispersed on high surface area carbons with noble metal concentrations between 5 to 40 wt % with 1:1 Pt:Ru atomic ratio. The tolerance of these Pt—Ru alloy electrocatalysts to carbon monoxide, even when they are provided with high noble metal loading, is unsatisfactory and the high noble metal loading makes them expensive.

In many fuel cell systems, a hydrogen fuel is produced by converting a hydrocarbon-based fuel such as methane, or an oxygenated hydrocarbon fuel such as methanol, to hydrogen in a process called reforming. This reformate fuel contains, in addition to hydrogen, high levels of carbon dioxide, usually around 25%. The reformate fuel also contains small amounts of impurities, such as carbon monoxide, typically at levels of around 1%.

Other fuel cells, called "direct" or "non-reformed" fuel cells oxidize fuel high in hydrogen content directly, without the hydrogen first being separated by a reforming process. It has been known since the 1950s that lower primary alcohols (the $C_1$–$C_5$ alcohols), particularly methanol, can be oxidized directly (i.e., without reformation to $H_2$+CO or $H_2$+$CO_2$) at the anode of a fuel cell. A substantial effort has gone into the development of the so-called "direct methanol oxidation" fuel cell because of the obvious advantage of direct oxidation of methanol, which bypasses the reformation step. However, the major drawback of methanol fuel is its sluggish oxidation rate, which results in poor cell current and voltage characteristics that make it unattractive for practical applications. Accordingly, the present effort in fuel cell development is focused on the use of reformate hydrogen as a fuel.

Considerable research and development has gone into adapting fuel cell technology for electrically powered vehicles. However, hydrogen is expensive and poses handling and storage problems when used in fuel cells that power electric vehicles. The solution to these problems has been the development of systems for the on-board generation of hydrogen by reforming methanol or gasoline. Methanol is stored in a fuel tank on board the vehicle and converted in a steam reformer to a mixture of gases containing predominantly hydrogen. These systems provide a comparatively inexpensive source of hydrogen fuel and significantly reduce the handling and storage of hydrogen since methanol is converted to hydrogen as needed to power the vehicle. However, these systems have encountered some problems because, in addition to containing hydrogen, the gas also contains small amounts of carbon monoxide which is a catalytic poison for platinum.

In a typical hydrogen/oxygen fuel cell, hydrogen is oxidized to produce electricity and water. The following reactions occur on the anode and cathode:

$$\text{Anode: } 2H_2 \rightarrow 4H^+ + 4e^- \quad (1)$$

$$\text{Cathode: } O_2 + 4H^+ + 4e^- \rightarrow 2H_2O \quad (2)$$

$$\text{Net reaction: } 2H_2 + O_2 \rightarrow 2H_2O \quad (3)$$

In order for the oxidation and reduction reactions in a fuel cell to occur at useful rates and at desired potentials, electrocatalysts are required. In the absence of an electrocatalyst, a typical electrode reaction would occur, if at all, only at very high overpotentials. Catalysts that promote the rates of electrochemical reactions are referred to as electrocatalysts. Electrocatalysts promote the reactions that occur in fuel cells and allow the cells to operate at lower overpotentials. This is important because the energy efficiency of any cell is determined, in part, by the overpotentials necessary at the cell's anode and cathode. Supported electrocatalysts based on platinum and platinum alloys are preferred for the anode and cathode fuel cell reactions.

A major obstacle in the development of fuel cells is the loss of electrochemical activity at the electrode due to "poisoning" of platinum electrocatalysts by carbon monoxide (CO). The CO molecule is strongly adsorbed on the electroactive surface of the electrode, obstructing the oxidation of new fuel molecules. It is well known that CO, even at levels of 1–10 ppm, is a severe poison to platinum electrocatalysts and significantly reduces fuel cell performance. When the carbon monoxide level in the fuel feed exceeds 20 ppm, it is impractical to use the platinum electrocatalysts that are commercially available.

In order for carbon monoxide to be oxidized on platinum the fuel cell anode must have a potential of at least 0.75V. For efficient operation, fuel cell anodes normally operate at potentials well below 0.75V. Therefore, fuels containing carbon monoxide cannot be efficiently used in fuel cells with platinum electrocatalysts. To overcome this problem, platinum has been alloyed with ruthenium to increase the oxidation of carbon monoxide at potentials well below 0.75V and thus improve the tolerance of electrocatalysts to carbon monoxide. It is believed that ruthenium sites in these alloys have an oxygen containing species that permits the oxidation of carbon monoxide at much lower potentials than platinum. It is also believed that the electronic effect resulting from the interaction of platinum and ruthenium reduces the carbon monoxide contamination, especially at very low potentials.

There are two problems with the platinum ruthenium electrocatalysts. (These electrocatalysts are commercially available from E-TEK Div. of De Nora N. A., Inc. 39 Somerset, N.J. and Johnson Matthey PLC of Ward Hill, Mass.) First, their tolerance to small amounts of carbon monoxide in hydrogen (10–100 ppm) is not satisfactory which leads to large power loss in fuel cells. Second, platinum loadings required for anodes are too high, which makes them very expensive.

Various attempts have been made to find a solution to the CO poisoning problem. For example, U.S. Pat. No. 5,225,391 to Stonehart et al. discloses the use of a four-element alloy containing predominantly Pt to improve the resistance to CO poisoning. In U.S. Pat. No. 5,856,036 to Smotkin et al., a catalyst composition consisting of Pt, Ru and Os is disclosed, while U.S. Pat. No. 6,007,934 to Auer et al. discloses catalysts consisting of unalloyed Pt and Ru particles on a carbon substrate. In spite of the foregoing efforts to solve the CO tolerance problems, no satisfactory solution has been found.

In spite of the foregoing, prior attempts to solve the problem of CO poisoning of a fuel cell anode using reformate hydrogen and to reduce platinum loadings, have been unsuccessful. Prior attempts to avoid these problems have proven to be too expensive, ineffective, or impractical to be commercially viable. Thus, there remains a need for electrocatalysts with increased tolerance to carbon monoxide that use less platinum than the commercial electrocatalysts that are presently available.

SUMMARY OF THE INVENTION

In accordance with the present invention, an electrocatalyst is provided for use in a fuel cell that has low platinum loading and a high tolerance to carbon monoxide poisoning. The fuel cell is used in the oxidation of hydrogen and has an anode which includes an electrocatalyst that has a conductive support material, ruthenium nanoparticles reduced in $H_2$ and a Group VIII noble metal. In one embodiment, the ruthenium nanoparticles deposited on a support material are suspended in water or a solvent. Preferably, the amount of the Group VIII noble metal is between about 0.1 and 25 wt % of said ruthenium nanoparticles, most preferably between about 0.2 and 15 wt %. The preferred Group VIII noble metal is platinum. In one embodiment, the anode can also have a perfluorinated polymer membrane on its surface.

In a preferred embodiment, the electrocatalyst of the present invention is used as an anode in a proton-exchange membrane fuel cell. The electrocatalyst includes a conductive support material, ruthenium nanoparticles reduced in $H_2$ and a Group VIII noble metal. In one embodiment, the ruthenium nanoparticles deposited on a support material are suspended in water or a solvent. The preferred amount of the Group VIII metal is between about 0.2 and 15 wt % of the ruthenium nanoparticles and the preferred Group VIII noble metal is platinum. The electrocatalyst is from about 10 to about 40 wt % platinum and ruthenium and from about 60 to about 90 wt % conductive material.

The conductive support material is preferably made of a finely divided carbon material and can be carbon black, graphitized carbon, graphite or active carbon. The ruthenium nanoparticles are deposited on the conductive support material. Preferably, these ruthenium nanoparticles have a size of from about 1 to about 50 nm, preferably from about 2 to about 20 nm. In one embodiment, the ruthenium nanoparticles deposited on a support material are suspended in water or a solvent. The Group VIII metal is then deposited on the outer surface of the conductive support material with the deposited ruthenium nanoparticles. The electrocatalyst is from about 10 to about 40 wt % platinum and ruthenium and from about 60 to about 90 wt % conductive material.

The supported electrocatalyst of the present invention is prepared by a process that includes depositing ruthenium nanoparticles on an electrically conductive support material and then heating the combination to a temperature of at least 100° C. in an $H_2$ atmosphere. The electrically conductive support material with deposited ruthenium nanoparticles is then cooled to a temperature of less than 50° C. and contacted with a solution that contains a Group VIII noble metal compound to form a supported electrocatalyst. The Group VIII noble metal compound is preferably a platinum compound and the solution is preferably an aqueous solution. A preferred platinum compound is $H_2PtCl_6$. In one embodiment, the surface of the supported electrocatalyst is contacted with a perfluorinated polymer membrane. In another embodiment a fuel cell anode is formed by applying a slurry of the Pt—Ru electrocatalyst of the invention onto a Nafion® membrane, which is then placed against a carbon backing.

In a preferred embodiment, the heating is carried out at a temperature of from about 100 to about 800° C., preferably from about 100 to about 400° C. The electrically conductive support material with deposited ruthenium nanoparticles is then cooled to a temperature of from about 20 to about 40° C. The electrocatalyst formed by this process is from about 10 to about 40 wt % Group VIII metal and ruthenium and from about 60 to about 90 wt % conductive material. The process minimizes the Group VIII metal loading by depositing the Group VIII metal on the surface of the supported electrocatalyst to form a thin layer of Group VIII metal on the ruthenium nanoparticles. The weight percent ratio of Group VIII metal to ruthenium is from about 0.02:1 to about 0.15:1. The Group VIII noble metal is preferably deposited on the surface of the electrocatalyst.

The process for preparing a supported electrocatalyst can also include contacting the supported electrocatalyst with water and then filtering and/or drying it. After the electrocatalyst is prepared, it can be kept in the water or filtered and dried. The electrically conductive support material can be carbon black, graphitized carbon, graphite or active carbon.

In a preferred embodiment of the invention, after the supported electrocatalyst is mixed with water to form a suspension. The water is then evaporated to form a homogenous electrocatalyst. For fuel cell electrode preparation, the catalyst is placed on a Nafion® membrane, directly or on a carbon backing. In another embodiment a fuel cell anode is formed by applying a slurry of the Pt—Ru electrocatalyst of the invention onto a membrane containing a perfluorinated polymer (such as a Nafion® membrane), which is then deposited on a carbon substrate.

The electrocatalysts currently used in fuel cells are expensive and have to be replaced frequently because of their high platinum loading and their susceptibility to poisoning by carbon monoxide in hydrogen fuels. The present invention has solved these problems by providing electrocatalysts that have a high tolerance to carbon monoxide poisoning and relatively low platinum loading.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

Figure 1:
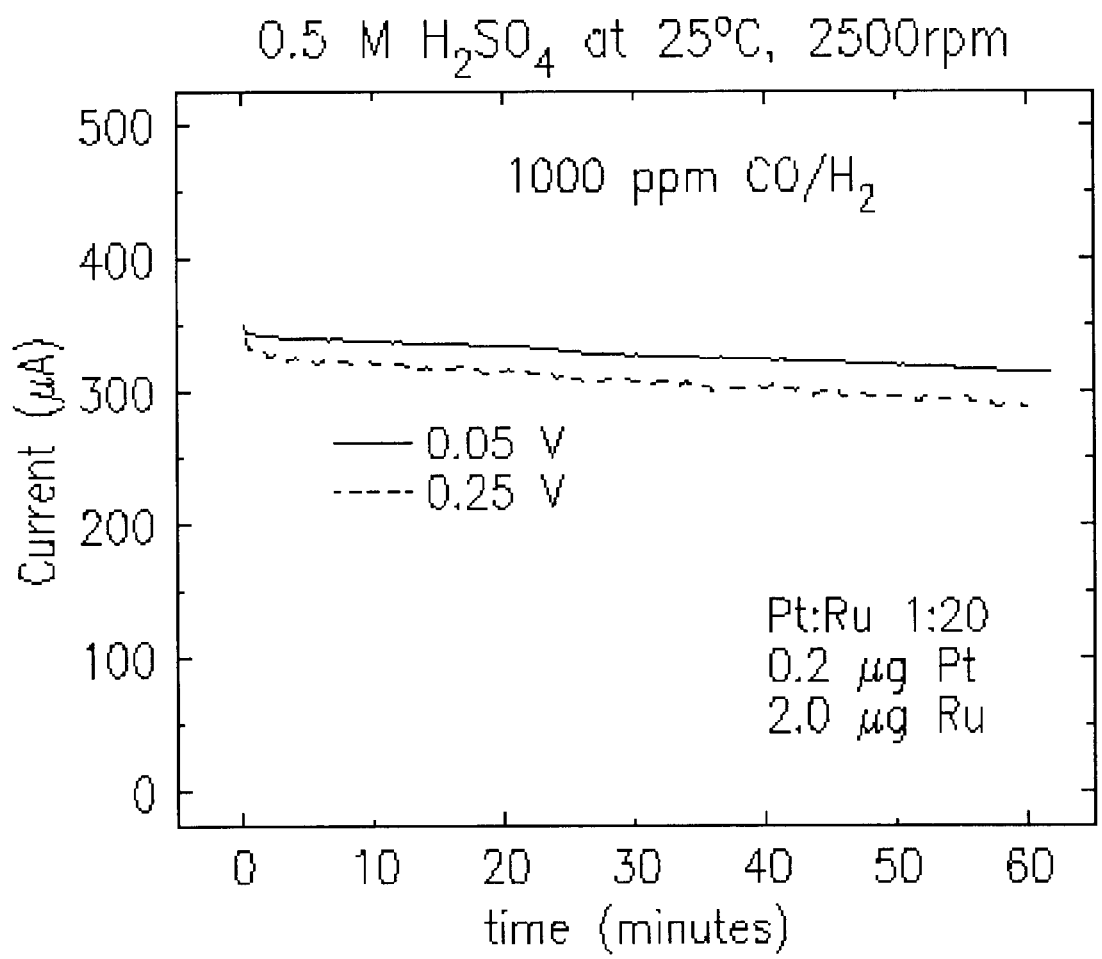
FIG. 1 is a graph showing polarization characteristics of the electrocatalyst of the invention.

The present invention relates to a Group VIII noble metal-ruthenium electrocatalyst with reduced Group VIII noble metal loading and an increased tolerance to carbon monoxide poisoning. The invention also includes a method for its preparation. In particular, the invention relates to platinum-ruthenium electrocatalyst with reduced platinum loading. The electrocatalysts of the present invention have a very low Group VIII noble metal loading and a high carbon monoxide tolerance. The low Group VIII noble metal loading provides a less expensive electrocatalyst and the high carbon monoxide tolerance of the electrocatalyst facilitates its operation with hydrogen containing high levels of carbon monoxide. The electrocatalyst can be used with hydrogen fuels containing carbon monoxide levels as high as 1000 ppm for extended periods of time with only a small loss in potential.

In a preferred embodiment of the present invention, platinum is spontaneously deposited on ruthenium nanoparticles that are deposited on a conductive support material. Spontaneous deposition of platinum on ruthenium requires a metallic (i.e., reduced) ruthenium surface in order to take place. The process for the spontaneous deposition of platinum on ruthenium is not described in the literature and is a subject of this invention. The most probable mechanism for spontaneous deposition of Pt on Ru involves a surface oxidation of Ru to RuOH or higher oxidation state, which provides electrons for reduction of $H_2PtCl_6$ to Pt. As part of this reaction, chloride anions are released into solution.

The electrocatalyst of the present invention can be used as an anode in different types of fuel cells and has been found to be particularly effective in PEM fuel cells. It can be incorporated in a variety of electrode shapes. For example, it can be used in "gas diffusion electrodes" consisting of hydrophobic carbon layers on which a porous layer of the catalyst is applied. These electrodes are part of the PEM cell. Alternatively, the polymer membrane can be coated directly with the electrocatalyst and the membrane electrode assembly (MEA) can be placed in contact with the hydrophobic carbon paper.

In accordance with the present invention, an anode for a proton-exchange membrane (PEM) fuel cell is provided for oxidizing reformate hydrogen containing small amounts of carbon monoxide. The anode contains significantly less platinum and has a better tolerance to carbon monoxide than the alloyed Pt—Ru electrocatalysts presently being used. When an electrocatalyst of the present invention is used for the anode in PEM fuel cells, it provides a significant cost decrease, improved efficiency and a reduction in size of the system. In addition, the design of the reformer can be simplified, which leads to further cost and size reduction. These results are achieved by depositing the platinum on the surface of the ruthenium instead of alloying the platinum and ruthenium.

The platinum deposition procedure of the present invention significantly reduces platinum loading compared to platinum-ruthenium alloys since platinum is located on the surface of the ruthenium particles instead of throughout platinum-ruthenium alloy nanoparticle. This leads to a considerable decrease in the amount of Pt used to prepare an active catalyst because Pt atoms inside alloyed particles do not contribute to the activity of the catalyst. The thin platinum layer islands have a higher surface area to weight ratio than alloyed platinum-ruthenium particles and oxidize hydrogen more efficiently. Therefore, more platinum is required to prepare an alloyed platinum-ruthenium that has an activity that is lower than the activity of the platinum deposited ruthenium particles of the present invention.

The Group VIII noble metal catalyst supported on the substrate is selected from the group consisting of platinum, palladium, ruthenium, iridium, rhodium, or a combination thereof. Platinum is the preferred Group VIII noble metal. Generally, the Pt:Ru atomic weight ratio will vary from about 0.02:1 to about 0.15:1; with a Pt:Ru ratio of about 0.05:1 being preferred.

Among the Group VIII noble metals, platinum (Pt) has been found to be the best electrochemical material for oxidation in fuel cells, due to its high hydrogen reaction kinetics. However, platinum is an expensive metal and this has limited its use in many applications. Thus, it is desirable to optimize the chemical activity of platinum by maximizing its surface area. The present invention provides a process for preparing electrochemically-active platinum particles that are highly dispersed by depositing it as a thin film on dispersed Ru nanoparticles. This high dispersion increases the surface area, and the thin film coating of the deposit reduces the loading of the platinum, or other Group VIII noble metal, that is available for chemical interaction.

The process for the preparation of the electrocatalysts of the present invention includes depositing ruthenium nanoparticles on an electrically conductive support material. Conductive support materials for Ru nanoparticles, which can be used, include carbon black, graphitized carbon, graphite or active carbon with a large specific surface area (50–1500 m$^2$/g). Deposition of Ru on support takes place from solution of RuCl$_3$, or ruthenium nitrosyl nitrate, by their reduction with often used reducing agents such as citric acid, sodium borohydride, hydrogen gas. Typical Ru loading is between 5 and 20 wt %. After reduction, the catalyst is filtered and dried. Preferably, the conductive support material is finely divided so that that a large surface area is obtained.

The ruthenium nanoparticles are deposited on the conductive support material by contacting it with a solution containing ruthenium. Preferred solutions are ruthenium chloride (RuCl$_3$) and ruthenium nitrosyl nitrate and they are deposited by adding a reducing agent to initiate a reduction reaction. The preferred reducing agents are sodium borohydride, hydrazine, citric acid, hydrogen, formic acid. Typical ruthenium loading is between about 5 and about 20 wt %. The loading is controlled by the concentration of ruthenium in the solution and the length of time the ruthenium solution contacts the conductive support material. The reducing agents are added to a carbon suspension (slurry) containing Ru salt. For high ruthenium loading, the deposition step can be repeated until the desired loading is achieved. After reduction of the ruthenium salt which typically requires from about 5 minutes to about 2 hours of contact time, preferably between about 10 and about 30 minutes, the catalyst is filtered and dried.

In another embodiment, Ru nanoparticles are prepared in solution phase from RuCl$_3$ by using reducing agents such as di-hydrogen orthophosphate (NaH$_2$PO$_4$), or mono-hydrogen orthophosphate(Na$_2$HPO$_4$) to maintain highly reducing conditions. After the reduction of RuCl$_3$, the Ru nanoparticles are removed from suspension in centrifuges, and deoxygenated water or a solvent replaces the remaining solution. The Ru nanoparticles remain suspended in the deoxygenated water or solvent.

The spontaneous deposition of Pt can also be carried out on Ru nanoparticles when they are prepared in solution phase and kept in deoxygenated water. The reaction can take place in either an Ru slurry or in a solution of Ru nanoparticles and deoxygenated water. A deoxygenated solution of H$_2$PtCl$_6$ or other Pt salt is added to the Ru nanoparticles. Excess chloride is removed using centrifuges and the Pt—Ru nanoparticles can then be stored in deoxygenated water.

Figure 3:
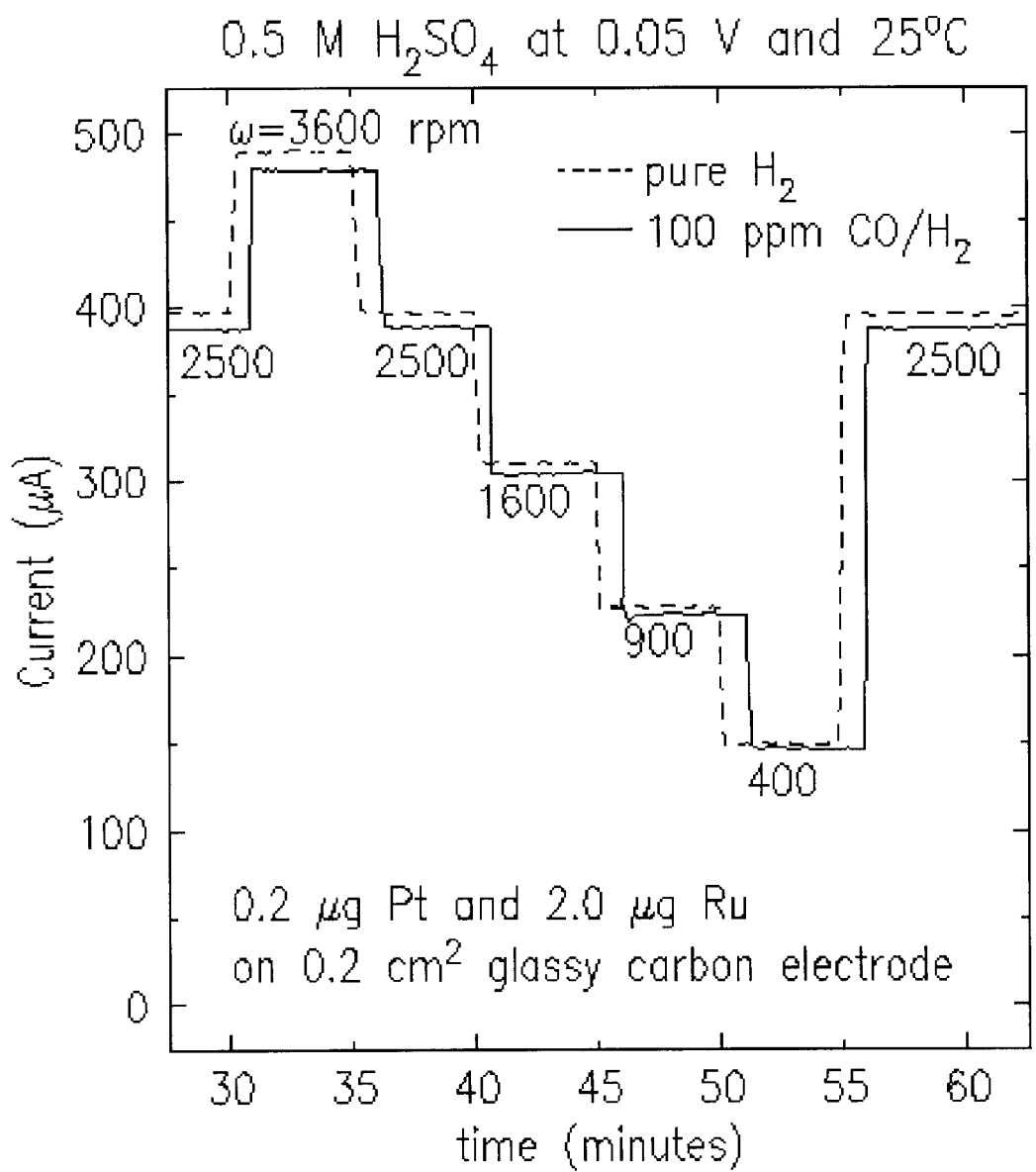
FIG. 3 is a graph showing polarization characteristics of the electrocatalyst of the invention for the oxidation of pure hydrogen and hydrogen containing 100 ppm carbon monoxide.

The examples that follow demonstrate that the electrocatalyst of the present invention provides a higher CO tolerance with significantly lower Pt:Ru atomic ratio (0.05:1) than the Pt:Ru alloy catalysts (atomic ratio 1:1) currently being used. Although the mechanism that enhances the CO tolerance is not completely understood, it is believed to be due mainly to the reduction of CO adsorption energy. FIG. 1 shows that the hydrogen oxidation current is substantially the same for pure hydrogen and hydrogen with 100 ppm CO. FIG. 3 shows that even when the potentials are varied, the oxidation currents for pure hydrogen and hydrogen with 100 ppm CO are nearly identical. Thus, the electrocatalyst of the present invention is shown to have very low CO adsorption for concentrations of up to at least 100 ppm.

The factors that enhance the CO tolerance of the electrocatalysts of the present invention are: 1) the structure of the Pt deposit itself, i.e., all the Pt atoms are on the surface of Ru nanoparticles; 2) the electronic effect caused by a strong interaction between the platinum and the Ru substrate; and 3) the small amount of adsorbed chloride remaining from the reduction process. Calculations of CO adsorption energy on Pt—Ru clusters with different configurations show that surface deposition of platinum on ruthenium nanoparticles yields the most efficient structure. The chloride effect is based on the higher frequency shifts of the CO vibration band in IR spectrum upon coadsorption of Cl on Pt. The higher frequency shift indicates a weakened Pt—CO bond by a lower level of back-donation from electro-deficient Pt atom to a CO antibonding orbital induced by the chloride coadsorption.

After the ruthenium nanoparticles have been deposited, the electrically conductive support material with the deposited ruthenium nanoparticles is heated in H$_2$ to further reduce the ruthenium. The heating is carried out at a temperature of from about 100 to about 800° C., preferably from about 100 to about 400° C. for a period of from about 30 minutes to about 6 hours, preferably from about 1 to 3 hours. The initial temperature of the oven or furnace in which the heating is carried out is less than 200° C. The temperature is then increased until the predetermined heating temperature is reached. The heating temperature and length of time of the heating cycle are determined based on several factors, including the specific type and amount of conductive support material that is being heated and the amount of ruthenium. Heating in H$_2$ atmosphere reduces the surface oxides of Ru that are usually formed in contact with O$_2$ or H$_2$O.

After the electrically conductive support material and the deposited ruthenium nanoparticles have been heated for the determined period of time, they are cooled to room temperature, that is a temperature of from about 20 to about 40° C., preferably about 25° C. The amount of time required for cooling is dependent upon the heating temperature and the amount and structure of the conductive support material.

The reduced ruthenium on the conductive substrate is then contacted with a solution comprising a Group VIII noble metal compound to form the supported electrocatalyst. Aqueous or alcoholic solutions can be used, aqueous being preferred. The Group VIII noble metal solution is preferably an aqueous solution and it forms a thin layer on the ruthenium nanoparticles. The preferred Group VIII noble metal compounds are platinum compounds, such as H$_2$PtCl$_6$, K$_2$PtCl$_4$, H$_2$PtBr$_6$, and PtCl$_2$. The supported electrocatalyst is contacted with H$_2$O (approximately 0.1 g per 100 ml H$_2$O) and stored in the water until it is ready to be used. The water dilutes the concentration of chlorides produced in the reduction of the platinum compounds (for example, when H$_2$PtCl$_2$ is reduced) whose charge is believed to be balanced by H+ ions formed in the oxidation of Ru. (Small amounts of chloride can remain on the electrocatalyst without significantly affecting its efficiency.) Alternatively, the electrocatalyst can be filtered and then dried.

In a preferred embodiment of the present invention, platinum is deposited as thin layer islands on ruthenium nanoparticles by spontaneous deposition. These platinum islands typically have a thickness of about 1–2 monolayers, i.e., 1–2 atom thick layer. Preferably, platinum is spontaneously deposited on clean metallic ruthenium particles by contacting them with a solution of $H_2PtCl_6$, $K_2PtCl_4$, $H_2PtBr_6$ or $PtCl_2$ for a period of time. The ruthenium particles with the platinum deposits are then stored in $H_2O$, or they can be removed from the chloride containing solution and dried. Adjusting the concentration of the $H_2PtCl_6$ solution and the time that the $H_2PtCl_6$ solution is in contact with the ruthenium particles controls the platinum loading and the thickness of the platinum layer islands. Repeating the deposition procedure can also increase the platinum loading. The electrocatalyst formed by the present invention is from about 10 to about 40 wt % Group VIII noble metal and ruthenium and from about 60 to about 90 wt % conductive material, preferably from about 20 to about 30 wt % Group VIII noble metal and ruthenium and from about 70 to about 80 wt % conductive material.

In one embodiment, after the supported electrocatalyst is filtered, it is contacted with water for a period of time so that the catalyst particles precipitate to the bottom of the container. The supported electrocatalyst can be used from suspension, or can be filtered and dried to remove the water. The weight percent ratio of Group VIII noble metal, preferably platinum, to ruthenium in the electrocatalyst is from about 0.02:1 to about 0.15:1 and wherein at least 90 wt % of the Group VIII noble metal is located on the surface of the electrocatalyst.

In another embodiment of the present invention, the supported electrocatalyst is mixed with water, preferably with a sonic mixing device, to form a suspension. The water in the suspension is then evaporated to form a homogenous electrocatalyst.

In a preferred embodiment, the process for the formation of the electrocatalyst includes heating Ru nanoparticles dispersed on carbon in a stream of $H_2$ to reduce Ru oxides and form metallic Ru nanoparticles. The particles are heated for from about 1 to about 6 hours, preferably about 1–2 hours at temperatures from about 150 to 800° C., preferably about 200 to 400° C. A deoxygenated water solution of $H_2PtCl_2$ is brought in contact with the Ru nanoparticles and a spontaneous deposition of Pt on Ru takes place. No other reducing agents are necessary. The procedure can be carried out in an $H_2$ or in an $N_2$ environment. As a result of the reaction, Pt ions are reduced and Pt islands are formed on Ru particles, while part of the Ru surface is oxidized. It is believed that the oxidized Ru surface provides the mechanism for the oxidation of CO. After the catalyst is formed, it is contacted with $H_2O$ and can be kept in it, or it can be filtered and dried.

In another preferred embodiment, the carbon-supported Ru nanoparticles are heated in a furnace with a quartz tube in a Pt or quartz container for 1–3 hours at temperatures of from about 150–400° C. After cooling to room temperature, an aqueous solution of $H_2PtCl_6$ is poured over Ru particles dispersed on carbon in an $H_2$ or an $N_2$ atmosphere. Typical Pt loading is 1 wt % and the amount of Pt is determined by concentration of Pt in solution and the volume of solution. After 20–30 min, the time that is sufficient for the spontaneous deposition of Pt to be complete. The catalyst is kept in water, or filtered and dried before use.

The performance of the electrocatalysts has been determined by using a rotating disk electrode methodology. A small volume of water slurry containing a desired amount of the electrocatalyst was placed on the glassy carbon rotating electrode and dried. Subsequently, the catalyst layer was covered by a small volume of Nafion® dissolved in alcohol. When the alcohol evaporates, it leaves a thin layer of membrane that holds the catalyst in place. The reactants $H_2$ and CO can diffuse through this membrane and, because the membrane is relatively thin, it does not introduce an additional diffusion resistance.

EXAMPLE 1

In this example, an electrocatalyst was prepared in accordance with the present invention. Ru nanoparticles 10 wt % on Vulcan X-72 carbon was reduced in $H_2$ at 300° C. for 1 hour to form a substrate. The temperature was then decreased to between 25 and 40° C. and contacted with 5 ml of $1 \times 10^{31}$ $^3$M $PtH_2Cl_6$ deoxygenated solution to deposit platinum on the ruthenium-carbon substrate and form the catalyst. After 20 minutes, the electrocatalyst was placed in 100 ml of water and sonicated to obtain a homogenous suspension.

20 µl of the electrocatalyst suspension was placed on the glassy carbon electrode in a rotating electrode assembly. The water was evaporated and 10 µl of Nafion® solution in alcohol (Aldrich Chemicals, Co.) diluted by water 50 times was placed on the catalyst. After evaporation of the water and alcohol, the Nafion® formed a thin membrane on the electrode. This procedure provided Pt loading of 1 wt %, or 0.2 µg per electrode (1 µg/cm$^2$) and 10 wt % of Ru, or 2 µg per electrode. The electrocatalyst was characterized by transmission electron microscopy (TEM), which revealed nanoparticles of 2 to 4 nm in diameter with lattice spacing corresponding to that of Ru. No lattice spacing for Pt was observed, probably because of its small loading.

EXAMPLE 2

In this example, the activity of the catalyst prepared in Example 1 (containing 0.2 µg Pt and 2.0 µg Ru) was compared with a commercial electrocatalyst (manufactured by e E-TEK Div. of De Nora N. A., Inc. of Somerset, N.J.) containing 2.6 µg Pt and 1.3 µg Ru. The activity and resistivity to poisoning by carbon monoxide of the electrocatalysts were determined by using potentiostatic polarization at two different potentials for the oxidation of $H_2$ and $H_2$ containing 1000 ppm of CO. The current response at a given potential was monitored as a function of time. Rotating disk electrode measurements were performed at 2500 rpm to maintain a well-defined constant flux of $H_2$ and CO.

The activity of each of the catalysts was measured using a rotating disk electrode in 0.5 M $H_2SO_4$ solution at 2500 rpm with the catalysts deposited on a glassy carbon electrode and held in place by a thin layer of a perfluorinated polymer membrane (Nafion®, manufactured by E. I. Du Pont De Nemours & Co. of Wilmington, Del.). Except for a differences in Pt loading and Ru loading, all other conditions were equal.

The polarization characteristics displayed in FIG. 1 show a high activity and high resistivity to poisoning by CO even for $H_2$ with a high CO concentration of 1000 ppm. The rate of pure $H_2$ oxidation is same for the overpotentials of 50 and 250 mV, because for this active electrode diffusion limited current density is reached already at 50 mV. A decrease in the activity of 7% is observed for the oxidation of H with 1000 ppm of CO at rotation rate of 2500 rpm within 1 h. The loss of the activity is small given these difficult conditions that probably exceed what can be expected for commercial fuel cells. Higher activity of the catalysts at 0.05V than at 0.25V is probably caused by weaker bonding of CO at Pt in the hydrogen adsorption region.

Figure 2:
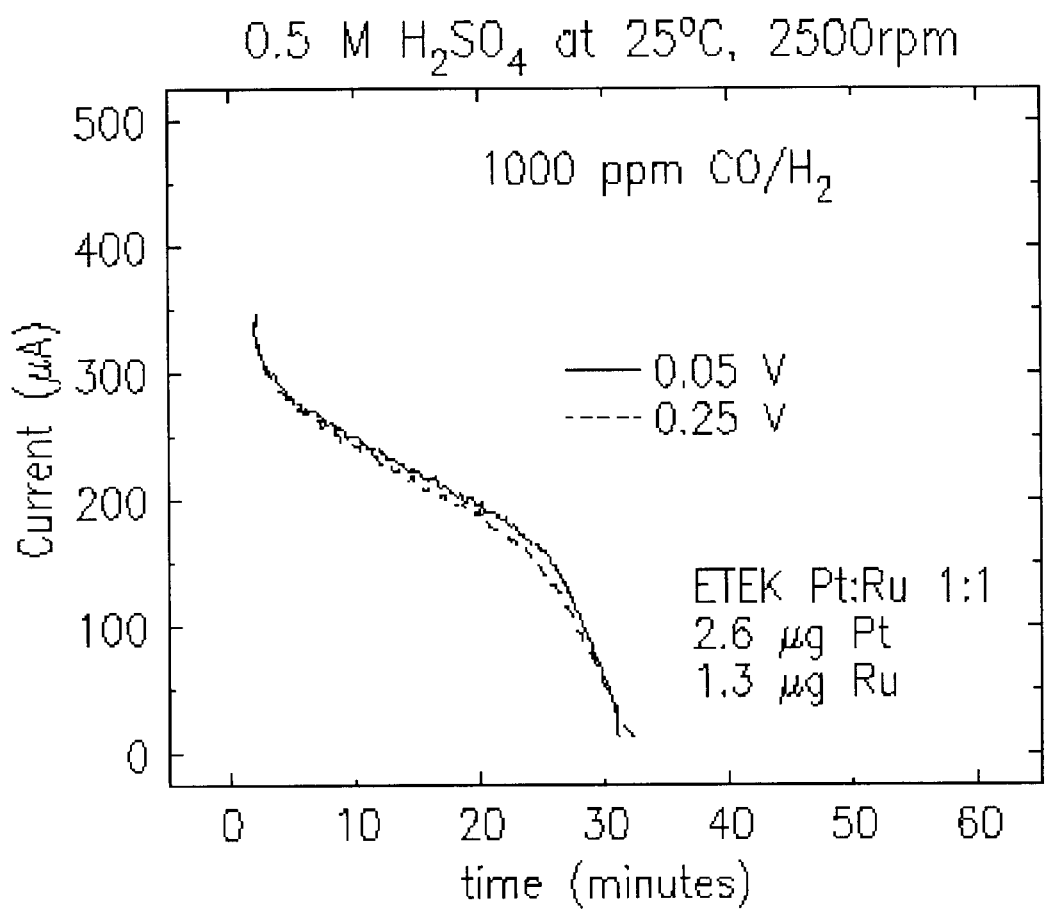
FIG. 2 is a graph showing polarization characteristics of a commercial state-of-the-art platinum-ruthenium alloy electrocatalysts.

FIG. 2 displays the polarization characteristics of commercial Pt—Ru catalyst 20 wt. % on Vulcan X72 with 1:1 Pt:Ru ratio. The amount catalyst placed on glassy carbon rotating electrode, as well as other conditions of the preparation of rotating electrode, were same as for the catalysts of the invention. As indicated in FIG. 1, the commercial catalyst has 13 times more Pt than the catalyst of the invention. Its polarization characteristics for the oxidation of pure hydrogen are the same as those in FIG. 1 for the catalyst of the invention. Its resistivity to CO poisoning is considerably lower than that of the catalyst of invention since it is completely poisoned within one-half hour in the oxidation of $H_2$ with 1000 ppm of CO, despite an order of magnitude larger Pt loading.

The data in FIG. 1 clearly show exceptional resistivity to CO poisoning of the catalyst of invention. Since this is achieved with a very low Pt loading, the data indicate an optimal placement and form of Pt on Ru nanoparticles, which facilitate a fast diffusion of CO to Ru sites where it is oxidized.

FIG. 1 is a graph of the polarization characteristics of the catalyst of the present invention. The graph shows the activity of the catalyst for the oxidation of pure hydrogen at 0.05 and 0.25 volts and hydrogen containing 1000 ppm of CO at 0.05 and 0.25 volts as a function of time. Note the activity of the catalyst for pure hydrogen is the same at 0.05 and 0.25 volts due to the absence of carbon monoxide. FIG. 2 is a similar graph for the commercial electrocatalyst. When the two graphs are compared for the oxidation of pure hydrogen, activity is substantially equal even though the loading of Pt in the electrocatalyst of the invention is approximately ten times lower. The catalyst of the present invention also shows a much better resistance to CO poisoning when hydrogen containing 1000 ppm of carbon monoxide is oxidized. The activity of the commercial catalyst decreases rapidly due to CO poisoning and within about 30 minutes, the catalyst is substantially inactive. In comparison, the catalyst of the present invention has a significantly higher carbon monoxide tolerance and the activity slowly decreases over time. After about one-hour, the activity decreases less than 10 percent.

EXAMPLE 3

For this example, the electrocatalyst of the invention was formed into a rotating disk electrode as described in Example 1 and the oxidation of pure hydrogen ($H_2$) and $H_2$ containing 100 ppm of CO was compared as a function of the rotation rate of the disk. Rotating disk electrode and potentiostat were produced by Pine Instrument Co., Grove City, Pa. The measurements were carried out in a 0.5M $H_2SO_4$ solution at 0.05V at a temperature of 25° C. At this small overpotential, the reaction kinetics for both the $H_2$ and the $H_2$ containing CO oxidations is controlled by the rate of diffusion of $H_2$, which indicate a high catalytic activity of this electrocatalyst.

Each of the fuels, pure hydrogen and hydrogen with carbon monoxide, was oxidized in the apparatus at 2500 rpm for approximately 25 to 30 minutes before test results were recorded. The rotation rate was then varied and the results recorded for approximately 30 minutes. Each rotation rate was maintained for approximately 5–10 minutes and then varied without stopping the experiment. The results are shown in FIG. 3 which is a graph of current versus time for the different rotation rates. FIG. 3 shows that there is a small difference between the currents at 0.05V for the oxidation of $H_2$ and $H_2$ with 100 ppm of CO. At lower rotation rates, this difference decreases.

The currents in both cases do not show time dependence at any rotation rate and after 55 min of polarization at various rates there is no perceptible degradation of the electrocatalyst. FIG. 3 also shows that the current is substantially the same for the three periods when the rotation rate was 2500 rpm. This indicates that the catalytic activity remained constant throughout the experiment. These results indicate a high activity and high CO tolerance of the catalyst. The small difference in the currents (activity) for pure $H_2$ and $H_2$ with 100 ppm CO demonstrates that a reformate fuel with 100 ppm CO can be used to replace pure hydrogen with negligible energy loss.

EXAMPLE 4

Figure 4:
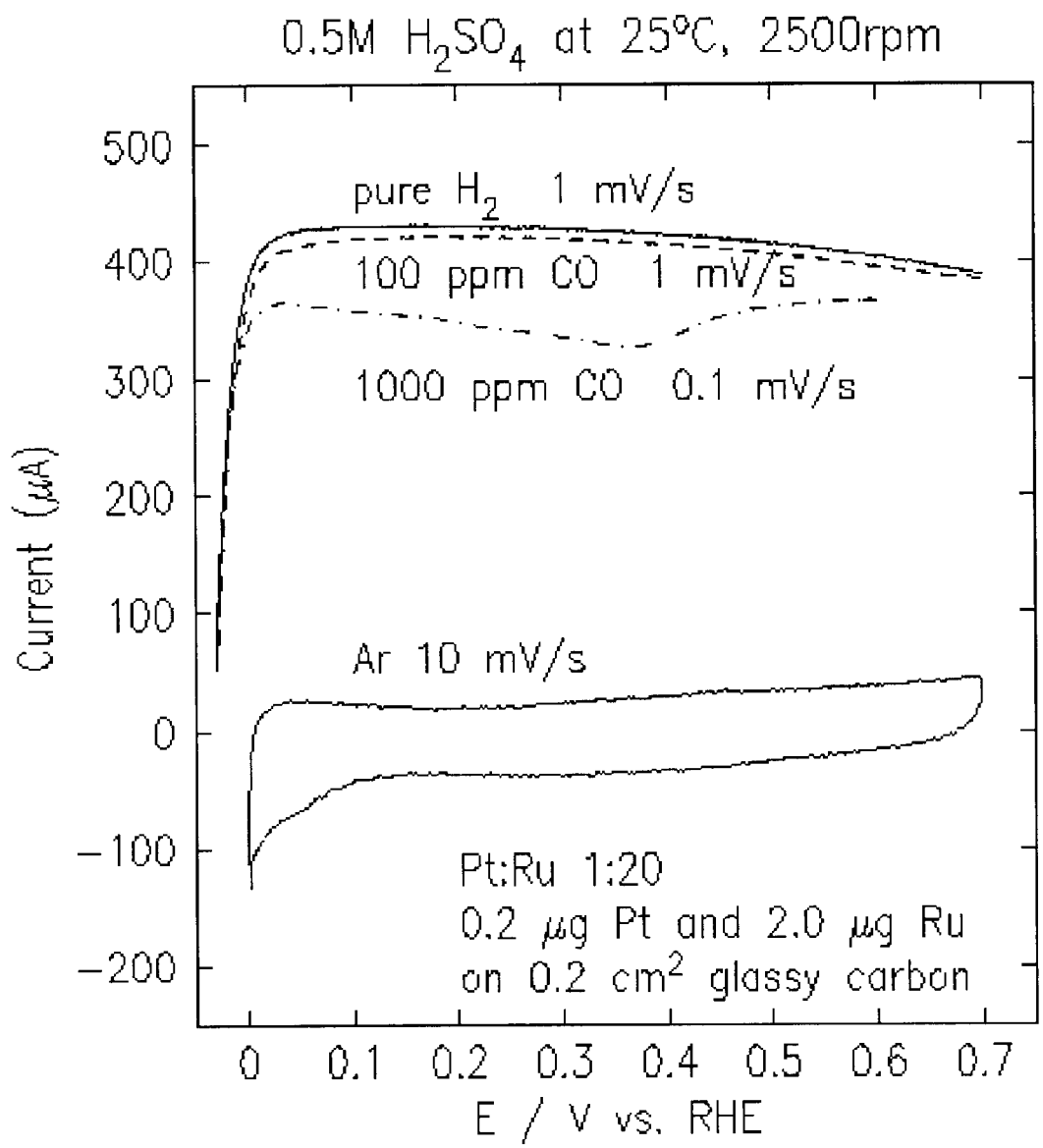
FIG. 4 is a graph showing polarization characteristics of the electrocatalyst of the invention for the oxidation of pure hydrogen, hydrogen containing 100 ppm carbon monoxide and hydrogen containing 1000 ppm carbon monoxide.

In this example, rotating disk electrodes were prepared as described in Example 1 and used for the oxidation of pure $H_2$, $H_2$ with 100 ppm of CO and $H_2$ with 1000 ppm of CO. FIG. 4 shows polarization curves for the oxidation of these three hydrogen fuels during a linear change of potential over time using the rotating disk electrodes. All of the polarization curves indicate a high activity of the catalyst and a very small poisoning effect of 100 ppm of CO.

The poisoning effect for 1000 ppm of CO is greater than for 100 ppm CO, and increases with increasing potential up to 0.38V. This is caused by a stronger CO bonding to Pt outside the potential range in which hydrogen is adsorbed on the Pt surface (E>0.15V for this electrocatalyst) and by the increased exposure time of the catalyst to CO, which has a greater effect at higher CO concentrations. When the potential exceeds 0.38V for CO concentrations of 1000 ppm, the oxidation of Ru becomes more pronounced and results in an increase in the activity of the electrocatalyst due to more efficient CO oxidation. Increased RuOH coverage takes place above 0.38V because of the increased oxidation. This is necessary for the continued operation of the electrode in order to eliminate increased CO coverage that can form at a CO concentration of 1000 ppm. Unlike commercial catalysts that are presently used, the electrocatalyst of the present invention does not exhibit irreversible loss of activity at low polarization for 1000 ppm of CO during the slow potential change of only 0.1V/s.

The lower portion of the graph in FIG. 4 shows the curve obtained in Ar (argon) atmosphere, which provides data on adsorption/desorption processes in base electrolyte solution. The hydrogen adsorption/desorption processes between 0 and 0.12V is associated with the hydrogen coverage, which is much smaller than for unsupported Pt, indicating strongly perturbed electronic properties of Pt in the interaction with Ru. This is one of the origins of the pronounced CO tolerance of the catalyst of the invention.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

What is claimed is:

1. A process for preparing a supported electrocatalyst comprising:
   - depositing ruthenium nanoparticles on an electrically conductive support material;
   - heating said electrically conductive support material with deposited ruthenium nanoparticles in $H_2$;
   - cooling said electrically conductive support material with deposited ruthenium nanoparticles; and
   - contacting said electrically conductive support material with deposited ruthenium nanoparticles with a solution comprising a Group VIII noble metal compound to form a supported electrocatalyst.

2. The process for preparing a supported electrocatalyst according to claim 1, wherein said Group VIII noble metal compound is a platinum compound.

3. The process for preparing a supported electrocatalyst according to claim 2, wherein the electrocatalyst is from about 10 to about 40 wt % platinum and ruthenium and from about 60 to about 90 wt % conductive material.

4. The process for preparing a supported electrocatalyst according to claim 2, wherein said platinum compound is $H_2PtCl_6$.

5. The process for preparing a supported electrocatalyst according to claim 2, wherein the weight percent ratio of platinum to ruthenium is from about 0.02:1 to about 0.15:1.

6. The process for preparing a supported electrocatalyst according to claim 1, wherein said heating is carried out at a temperature of from about 100 to about 400° C.

7. The process for preparing a supported electrocatalyst according to claim 1, wherein said electrically conductive support material with deposited ruthenium nanoparticles is cooled to a temperature of from about 20 to about 40° C.

8. The process for preparing a supported electrocatalyst according to claim 1, wherein said solution comprising said platinum compound is an aqueous solution.

9. The process for preparing a supported electrocatalyst according to claim 1, wherein a thin layer of platinum is formed on said ruthenium nanoparticles.

10. The process for preparing a supported electrocatalyst according to claim 1, further comprising contacting said supported electrocatalyst with water.

11. The process for preparing a supported electrocatalyst according to claim 10, further comprising filtering said supported electrocatalyst.

12. The process for preparing a supported electrocatalyst according to claim 10, further comprising drying said supported electrocatalyst.

13. The process for preparing a supported electrocatalyst according to claim 10, further comprising mixing said supported electrocatalyst and water to form a suspension.

14. The process for preparing a supported electrocatalyst according to claim 13, further comprising evaporating said water to form a homogeneous electrocatalyst.

15. The process for preparing a supported electrocatalyst according to claim 14, further comprising contacting said homogeneous electrocatalyst with a solution comprising a perfluorinated polymer.

16. The process for preparing a supported electrocatalyst according to claim 1, wherein said electrically conductive support material is carbon black, graphitized carbon, graphite or active carbon.

17. The process for preparing a supported electrocatalyst according to claim 11, wherein said Group VIII noble metal is on the surface of said electrocatalyst.

18. The process for preparing a supported electrocatalyst according to claim 1, wherein said ruthenium nanoparticles are suspended in water or a solvent to form a slurry.

19. The process for preparing a supported electrocatalyst according to claim 18, further comprising contacting a membrane comprising a perfluorinated polymer with said slurry.

20. The process for preparing a supported electrocatalyst according to claim 19, further comprising depositing said membrane and slurry on a carbon substrate.

* * * * *